US007964996B2

(12) United States Patent
Bychkov et al.

(10) Patent No.: US 7,964,996 B2
(45) Date of Patent: Jun. 21, 2011

(54) SYSTEMS AND METHODS FOR PROTECTING PERIPHERAL DEVICES FROM SURGES

(75) Inventors: Eyal Bychkov, Hod Hasharon (IL); Sharon Kaluski Kimchi, Shaked (IL); Itzhak Pomerantz, Kefar Saba (IL)

(73) Assignee: SanDisk IL Ltd., Kfar Saba (IL)

( * ) Notice: Subject to any disclaimer, the term of this patent is extended or adjusted under 35 U.S.C. 154(b) by 385 days.

(21) Appl. No.: 11/772,215

(22) Filed: Jun. 30, 2007

(65) Prior Publication Data

US 2008/0296980 A1 Dec. 4, 2008

Related U.S. Application Data

(60) Provisional application No. 60/940,421, filed on May 28, 2007.

(51) Int. Cl.
*H02H 1/04* (2006.01)

(52) U.S. Cl. ........................................ 307/140; 361/110

(58) Field of Classification Search .................. 307/131, 307/140; 361/110, 111; 379/27.05
See application file for complete search history.

(56) References Cited

U.S. PATENT DOCUMENTS 5,617,008 A 4/1997 Eastmond et al.
5,745,327 A * 4/1998 Choo ............................ 361/111
5,886,431 A * 3/1999 Rutigliano .................... 307/131
5,928,336 A 7/1999 Takeuchi
5,973,419 A * 10/1999 Kruppa et al. ................ 307/131
6,456,091 B1 * 9/2002 Lee et al. ...................... 324/556
6,526,515 B1 2/2003 Charles et al.
6,662,301 B1 12/2003 Sekine et al.
6,665,801 B1 12/2003 Weiss
6,671,814 B1 12/2003 Kubo et al.
6,684,337 B1 1/2004 Kuo et al.
7,412,628 B2 * 8/2008 Shikada .......................... 714/43
2006/0265540 A1 11/2006 Mass et al.
2008/0301483 A1 12/2008 Bychkov et al.

OTHER PUBLICATIONS

Office Action dated Dec. 7, 2010, U.S. Appl. No. 11/772,213, filed Jun. 6, 2007.

* cited by examiner

*Primary Examiner* — Albert W Paladini
(74) *Attorney, Agent, or Firm* — Vierra Magen Marcus & DeNiro LLP

(57) ABSTRACT

The present invention discloses methods for protecting a peripheral device in a computing system from electrical surge currents, the method including the steps of: providing a controller operationally connected to a host system; and reversibly conductively connecting, via the controller, wires of the device to the host system. Preferably, the device is connected to the host system via a connector. Preferably, the device is hard-wired to the host system. Preferably, at least some wires of the device are isolated from the host system via a mechanical contactor. Preferably, at least some wires of the device are isolated from the host system via an optical isolator. Preferably, the method further includes the step of: charging a switching battery when the device is disconnected from the host system. Most preferably, the method further includes the step of: powering the device using the battery when the device is connected to the host system.

25 Claims, 4 Drawing Sheets

SYSTEMS AND METHODS FOR PROTECTING PERIPHERAL DEVICES FROM SURGES

RELATED APPLICATIONS

This patent application claims priority under 35 U.S.C. §119(e) to U.S. Provisional Application No. 60/940,421, filed May 28, 2007, which is hereby incorporated by reference in its entirety.

This patent application is related to U.S. patent application Ser. No. 11/772,213 of the same inventors, which is entitled "SURGE-PROTECTED PERIPHERAL DEVICES" and filed on the same day as the present application. That patent application, also claiming priority to U.S. Provisional Application No. 60/940,421, is incorporated in its entirety as if fully set forth herein.

FIELD AND BACKGROUND OF THE INVENTION

The present invention relates to methods for protecting a peripheral device in a computing system from damage due to surge currents.

In addition to other capabilities, personal computers provide users with storage memory for digital content. The amount of media created by a user is increasing due to the pervasive use of portable devices (e.g. digital cameras). Since the media is typically copied to the computer and then erased from the portable device, the personal computer becomes a single storage device for content that has no backup in any other location.

Backup of stored content on personal computers can be a critical concern to business and personal users. Stationary backup devices (e.g. external hard-disk drives and remote backup services) are not available when the user is traveling or working off-line. The use of a different location on a hard-disk drive, or a second hard-disk drive on the same computer for backup is not always possible. Furthermore, the hard disk itself has some probability of crashing, either due to extended use or due to extended power cycling. There is a need for built-in, reliable, automatic backup methods that provide the user with confidence that important information on the user's hard disk has a backup.

Additional peripheral devices, connected to a computer, that are not frequently used (e.g. a business-card scanner, a desktop scanner, a photograph printer) are also continuously exposed to the risk of surge currents, and could benefit from a solution that protects the devices from surge damage without physically detaching the devices from the computer.

It would be desirable to have methods for protecting a peripheral device in a computing system from damage due to surge currents.

SUMMARY OF THE INVENTION

It is the purpose of the present invention to provide methods for protecting a peripheral device in a computing system from damage due to surge currents.

For the purpose of clarity, several terms which follow are specifically defined for use herein. The term "dormant-peripheral network protocol" is used herein to refer to a peripheral device in a computing system that is not conductively connected to a host system, and can be connected and activated by a remote command. The term "surge protection" is used herein to refer to protection of an electronic device from surge currents (e.g. currents caused by lightning). The term "dormant backup" is used herein to refer to a built-in backup device that is configured to have high reliability due to a low usage duty-cycle. The expression "conductively disconnected" is used herein to mean that none of the conducting elements of a device are connected to any of the conductive elements of a host system.

In a preferred embodiment of the present invention, the use of a reliable non-volatile storage device (e.g. a hard-disk drive or a flash-disk drive), which is connected to a host system, increases the "mean time between failures" (MTBF) of the device by several orders of magnitude by maintaining the device in a dormant mode (i.e. powered off) and electrically-disconnected state from the host system for a majority of the time, powering the device on only when needed by the host system.

A program running on the host system schedules a backup operation as new content is created in the main storage device of the host system. The backup operation includes backup of new media files, documents updates, and new e-mail. Periodically, the program instructs a secondary non-volatile storage device (different than the main storage device) that is operationally connected to the host system, but electrically disconnected from the host system, to be powered on. Once powered and connected to the host system, the program backs up the scheduled files to the secondary device, with or without compression, using methods known in the art of software engineering.

Once the content has been backed up and verified, the program powers off the secondary storage device, and electrically disconnects the device from any galvanic contact with the circuitry of the host system. The result is that the secondary storage device is powered on much less frequently than the main storage device, and for much shorter periods of time. These two features of operation extend the life expectancy and the MTBF of the secondary device far beyond those of an alternative device that is powered on each time the host system is powered on, and is operating throughout the session of the host system.

An important aspect of the present invention is that by being electrically disconnected from the host system, the secondary device is much less susceptible to surge currents caused by power-line fluctuations and by lightning.

In another preferred embodiment of the present invention, the method is applied to peripherals device other than disk drives (e.g. USB scanners and special printers) that are connected to the host system, and are powered from the host system. According to the present invention, such peripheral devices are connected to a USB socket, which is completely disconnected from any conductive connection with the host system, and are powered and used only when needed.

Therefore, according to the present invention, there is provided for the first time a method for protecting a peripheral device in a computing system from electrical surge currents, the method including the steps of: (a) providing a controller operationally connected to a host system; and (b) reversibly conductively connecting, via the controller, wires of the device to the host system.

Therefore, according to the present invention, there is provided for the first time a computing system including: (a) a host system; (b) at least one device, mechanically connected to the host system, each device having an active state and an inactive state, wherein each device is conductively disconnected from the host system when the inactive state is enabled; and (c) a mechanism for the host system to switch each device between the active state and the inactive state.

Preferably, the device is connected to the host system via a connector.

Preferably, the device is hard-wired to the host system.

Preferably, at least some wires of the device are isolated from the host system via a mechanical contactor.

Preferably, at least some wires of the device are isolated from the host system via an optical isolator.

Preferably, the method further includes the step of: (c) charging a switching battery when the device is disconnected from the host system.

Most preferably, the method further includes the step of: (d) powering the device using the battery when the device is connected to the host system.

These and further embodiments will be apparent from the detailed description and examples that follow.

BRIEF DESCRIPTION OF THE DRAWINGS

The present invention is herein described, by way of example only, with reference to the accompanying drawings, wherein.

DESCRIPTION OF THE PREFERRED EMBODIMENTS

The present invention relates to methods for protecting a peripheral device in a computing system from damage due to surge currents. The principles and operation for protecting a peripheral device in a computing system from damage due to surge currents, according to the present invention, may be better understood with reference to the accompanying description and the drawings.

Figure 1:
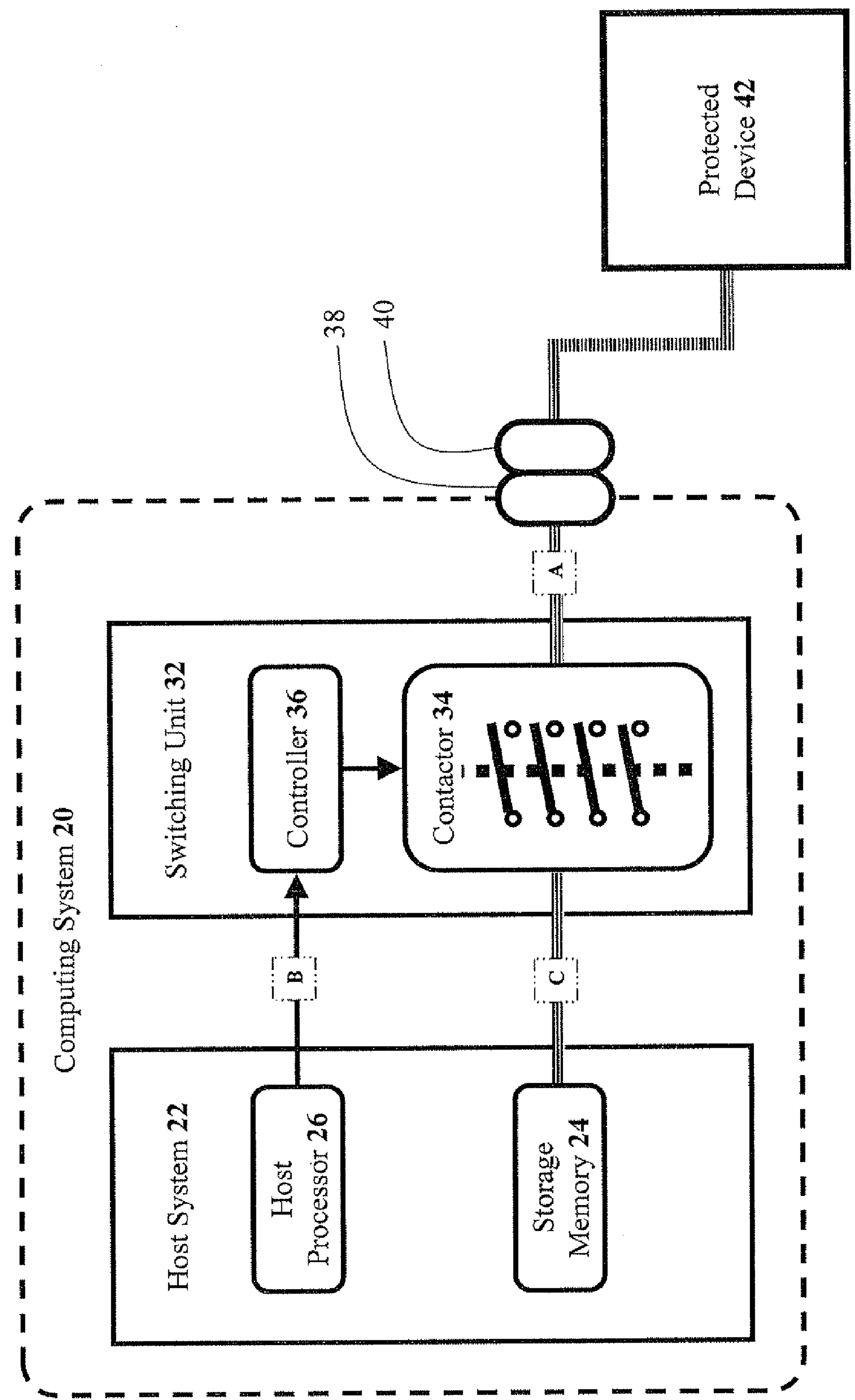
FIG. 1 is a simplified schematic block diagram of a system for connecting to a protected device using an electromechanical contactor, according to preferred embodiments of the present invention.

Referring now to the drawings, FIG. 1 is a simplified schematic block diagram of a system for connecting to a protected device using an electromechanical contactor, according to preferred embodiments of the present invention. A computing system 20 includes a host system 22 (e.g. a personal computer) that has, among other components, a storage memory 24 (e.g. a built-in hard-disk drive) and a host processor 26.

A peripheral protected device 42 (e.g. a backup disk drive) is connected to computing system 20 via a multi-pin socket 38 (e.g. a standard USB socket) and a multi-pin connector 40 (e.g. a standard USB plug). Connections A of socket 38 are not electrically connected to host system 22. Connections A are connected to isolated ports of a switching unit 32 via an electromechanical contactor 34. Electromechanical contactor 34 is connected to a controller 36 which is controlled by host processor 26 via connections B. The other side of contactor 34 is connected to host system 22 using a standard bus connection C.

Host system 22 controls controller 36, via host processor 26, for switching contactor 34 on and off. In the steady-state situation, controller 36 keeps contactor 34 disconnected. The data lines, VCC line, and ground line (not explicitly shown) are disconnected from protected device 42. Any surge current that may hit host system 22, via a power line, network cables, or other means connected to host system 22, will not affect protected device 42.

When there is a need to use protected device 42 (e.g. to perform a backup operation), host processor 26 temporarily instructs controller 36 to connect protected device 42 to host system 22. Protected device 42 is powered, and when ready, host system 22 uses protected device 42 for backup or for any other function. When the operation is over, host processor 26 instructs controller 36 to disconnect protected device 42 and computing system 20 returns to a steady state. Protected device 42 can be, for example, a hard-disk drive, or a solid-state drive, or any other peripheral.

Figure 2:
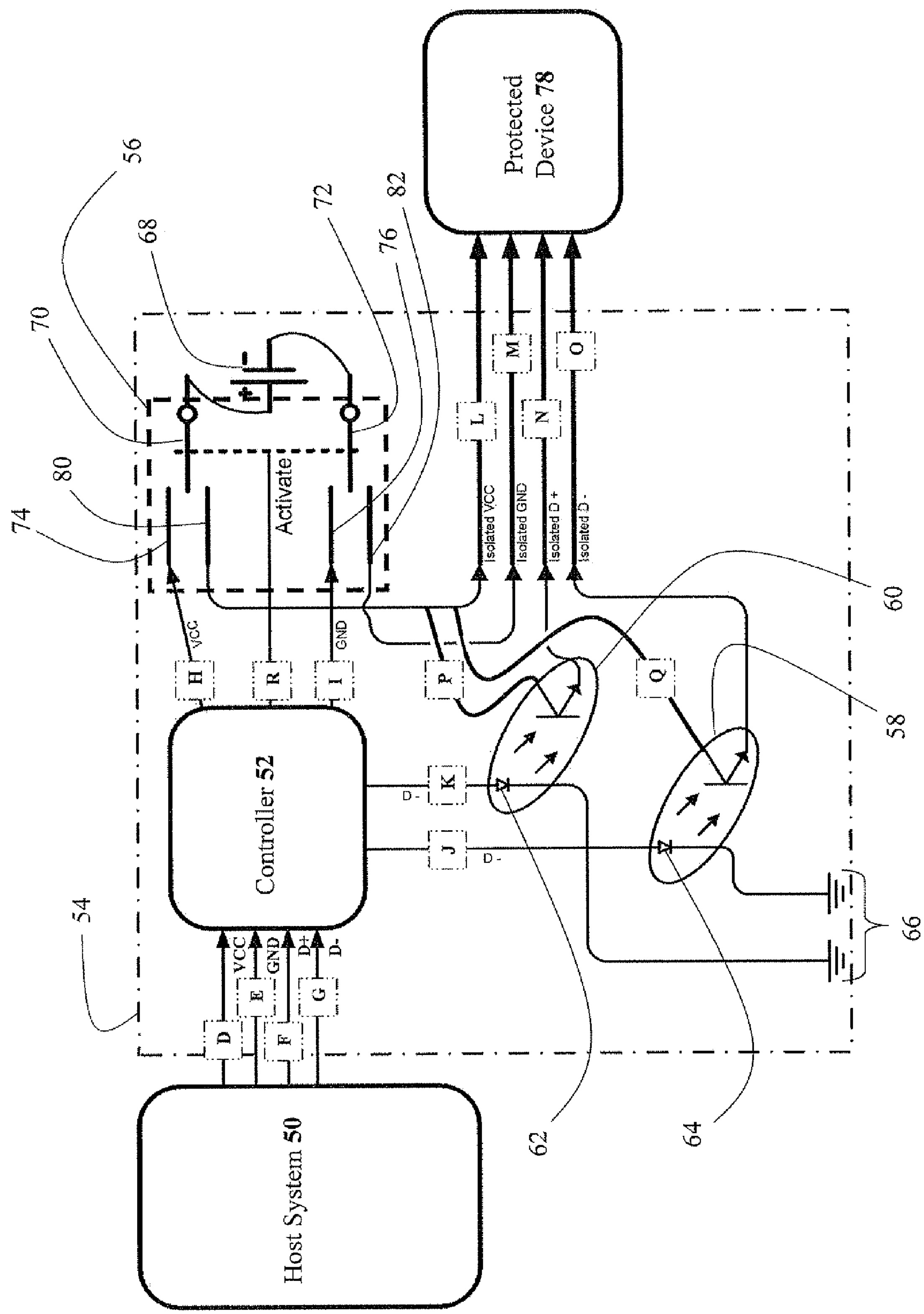
FIG. 2 is a simplified schematic block diagram of a system for connecting to a protected device using an electronic isolated contactor, according to preferred embodiments of the present invention.

FIG. 2 is a simplified schematic block diagram of a system for connecting to a protected device using an electronic isolated contactor, according to preferred embodiments of the present invention. FIG. 2 shows an electronic embodiment of the present invention that is suitable for fast digital traffic and for a standard USB connector. A host system 50 is connected via a USB link to a controller 52 of a sub-system 54 (e.g. a protected USB port). The USB link includes four wires: a VCC line D, a ground line E, and D+/D− data lines F and G, as described in the USB Specification, rev. 2.0, Chapter 4.2.1—Electrical.

Figure 3:
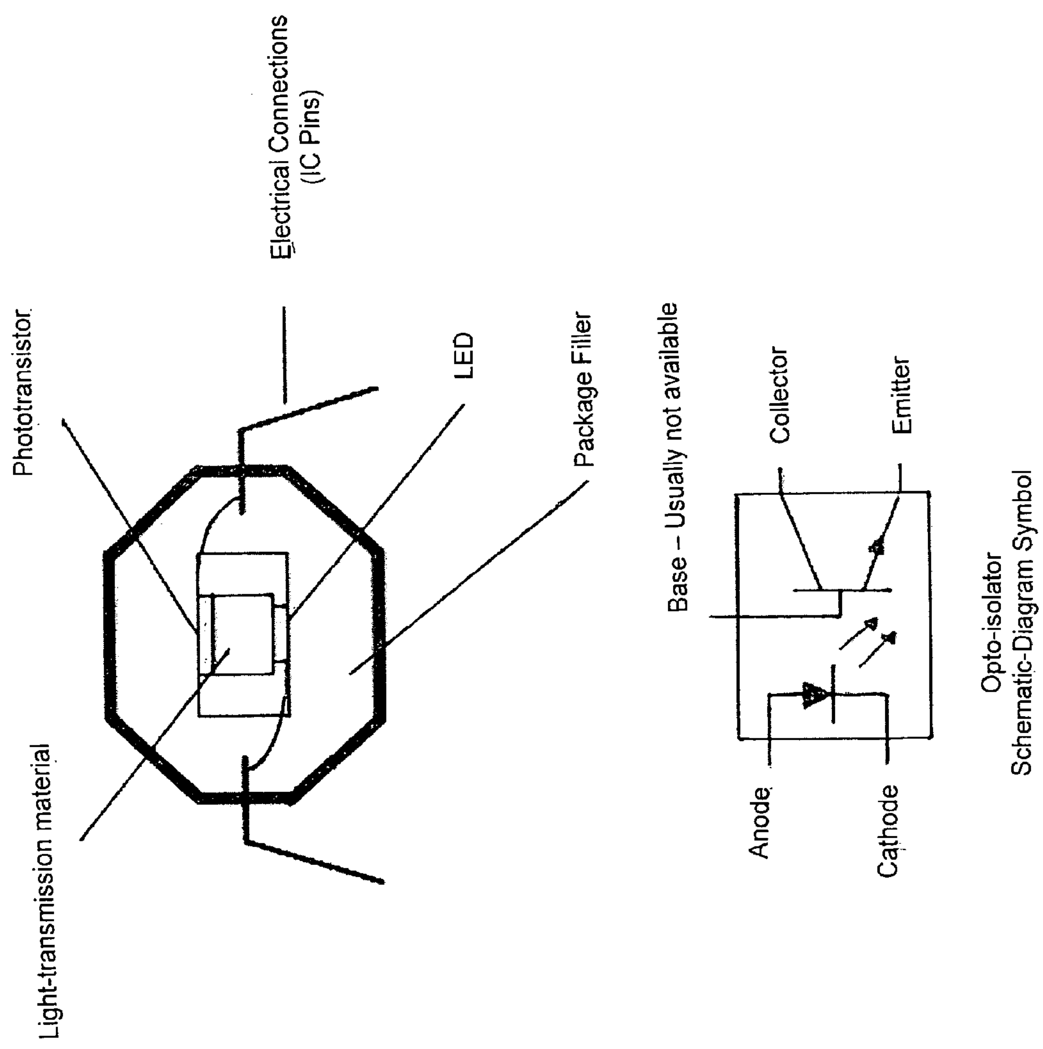
FIG. 3 is a simplified schematic block diagram of a commercial optical switch/isolator, according to the prior art.

Controller 52 routes VCC line D and ground line E to two ports H and I of a contactor 56, and routes data lines F and G, via lines J and K, to optical switches 58 and 60, such as described in the Chapter 2 of *The Digital I/O Handbook* (available from SeaLevel Systems, Liberty, S.C.). FIG. 3 is a simplified schematic block diagram of a commercial optical switch/isolator taken from *The Digital I/O Handbook.*

It should be noted that since the D+ and D− signals in the USB protocol are alternately flowing in both directions, each of lines J and K requires two optical switches for the two opposite directions, but for the simplicity of the drawing only one is shown for each in FIG. 2 (i.e. switches 58 and 60, respectively). Light-emitting diodes 62 and 64 are in the direction of current flowing towards ground points 66. An isolated VCC line L is connected to the emitters of optical switches 58 and 60 in the reverse directions (via lines P and Q), and data lines N and O are connected to the collectors of optical switches 58 and 60.

Four additional optical switches, driven by data lines N and O for outputting signal to data lines J and K, are not shown in FIG. 2. Thus, in FIG. 2, optical switches 58 and 60 represent 8 optical switches (i.e. 4 switches for input, two for D+ and two for D− signals, and 4 switches for output, two for D+ and two for D− signals). For each D+ and D− signal, there are two switches: one switch for the positive current and one switch for the negative current.

A battery 68 is connected between central leads 70 and 72 of contactor 56. In the steady-state situation, contactor 56 is controlled, via a control line R, by controller 52 to connect lead 70 to a lead 74 and lead 72 to a lead 76. This keeps battery 68 continuously charged.

Sub-system 54 is connected to a peripheral protected device 78 that does not make contact with any conductive contacts of the chassis or the circuitry of subsystem 54. When lead 80 of contactor 56 is not connected, isolated VCC line L of sub-system 54 is electrically isolated, and the collectors of optical switches 58 and 60 (as well as the switches not shown) are not electrically connected to the circuitry of host system 50. When lead 82 of contactor 56 is not connected, ground line M of subsystem 54 is electrically isolated. Data lines N and 0 of sub-system 54 are always electrically isolated because data lines N and 0 are hard-wired to the emitters of optical switches 58 and 60, and the emitters are not connected to the circuitry of host system 50, and receive VCC and ground connections through contactor 56.

Figure 4:
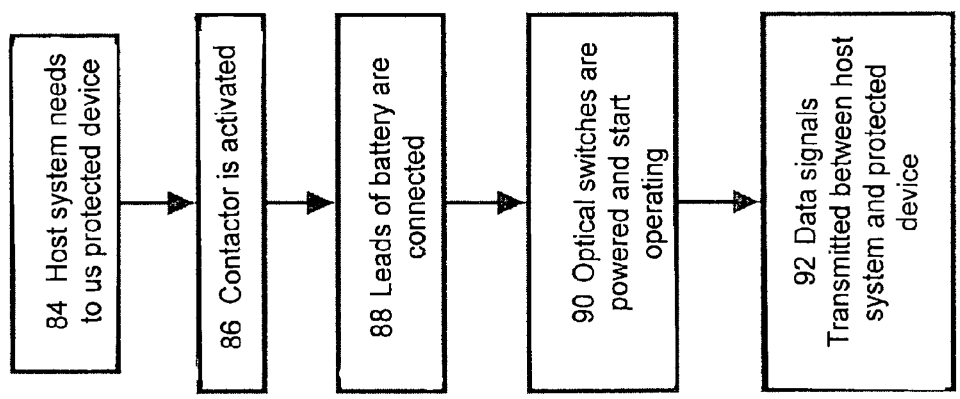
FIG. 4 is a simplified flowchart of the operation of a system for connecting to a protected device using an electronic isolated contactor, according to preferred embodiments of the present invention.

FIG. 4 is a simplified flowchart of the operation of a system for connecting to a protected device using an electronic isolated contactor, according to preferred embodiments of the present invention. The reference numerals of FIG. 2 are used to provide better clarity. When host system 50 needs to use protected device 78 that is plugged in sub-system 54 (Step 84), host system 50 instructs controller 52 to activate contactor 56, via control line R, in order to switch contactor 56 to the active position (Step 86). Positive lead 70 of battery 68 is then connected to isolated VCC lead 80, and negative lead 72 of battery 68 is connected to isolated ground lead 82 (Step 88). Optical switches 58 and 60 (as well as the switches not shown) are powered and start operating (Step 90), delivering data signals between host system 50 and protected device 78 (Step 92).

While the invention has been described with respect to a limited number of embodiments, it will be appreciated that many variations, modifications, and other applications of the invention may be made.

What is claimed is:

1. A method for reducing a peripheral device's exposure to electrical surge currents, the method comprising via a controller, when operationally connected to a host system:

conductively connecting wires of the peripheral device to the host system in response to a first instruction from the host system; and conductively disconnecting wires of the peripheral device from the host system in response to a second instruction from the host system;

wherein at least some of the wires of the peripheral device are isolated from the host system via a mechanical contactor.

2. The method of claim 1, wherein the peripheral device is connected to the host system via a connector.

3. The method of claim 1, wherein the peripheral device is hard-wired to the host system.

4. The method of claim 1, wherein at least some of the wires of the peripheral device are isolated from the host system via an optical isolator.

5. A method for reducing a peripheral device's exposure to electrical surge currents, the method comprising via a controller, when operationally connected to a host system:

conductively connecting wires of the peripheral device to the host system in response to a first instruction from the host system;

conductively disconnecting wires of the peripheral device from the host system in response to a second instruction from the host system; and charging a switching battery when the peripheral device is disconnected from the host system.

6. The method of claim 5, further comprising:

powering the peripheral device using the battery when the peripheral device is connected to the host system.

7. A method for reducing a peripheral device's exposure to electrical surge currents, the method comprising via a controller, when operationally connected to a host system:

conductively connecting wires of the peripheral device to the host system in response to a first instruction from the host system; and conductively disconnecting wires of the peripheral device from the host system in response to a second instruction from the host system;

wherein the controller is operationally connected to the host system while the wires of the peripheral device are conductively connected to or disconnected from the host system.

8. A method of controlling a peripheral device to reduce exposure to electrical surge currents, comprising:

providing, via a contactor in a switching unit having a controller connected to the contactor, conductive disconnection between the peripheral device and a host device when the peripheral device is inactive;

receiving at the controller, when the peripheral device is inactive, a host system instruction to activate the peripheral device; and in response to the host system instruction, conductively connecting the peripheral device to the host system via the contactor to permit delivery of one or more data signals between the host system and the peripheral device.

9. A method according to claim 8, wherein:

the switching unit includes isolated lines in communication with the contactor, the isolated lines adapted for coupling with the peripheral device to provide electrical isolation between the peripheral device and the host system when the peripheral device is inactive.

10. A method according to claim 8, further comprising:

receiving at the controller a host system instruction to inactivate the peripheral device; and in response to the host system instruction to inactivate the peripheral device, conductively disconnecting the peripheral device from the host system via the contactor to prevent delivery of power and data signals between the host system and the peripheral device.

11. A method according to claim 8, wherein:

the peripheral device is operationally connected to the host system when the peripheral device is active and inactive.

12. A method according to claim 8, wherein:

the peripheral device is a non-volatile storage device; and the host system instruction is a data backup operation request.

13. A method according to claim 8, wherein:

the contactor is coupled between the peripheral device and the host system.

14. A method according to claim 8, wherein:

the contactor is coupled between the peripheral device and the controller; and the controller is coupled between the host system and the contactor.

15. A switching system for reducing exposure to electrical surge currents by a peripheral device, comprising:

a contactor adapted for coupling with the peripheral device; and a controller in communication with the contactor and a host system, the controller operative to provide conductive disconnection between the peripheral device and the host system when the peripheral device is inactive, the controller operative to receive from the host system an instruction to access the peripheral device and in response to the instruction, to conductively connect the peripheral device to the host system using the contactor to permit delivery of one or more data signals between the peripheral device and the host system.

16. A system according to claim 15, further comprising:

a plurality of isolated lines adapted for coupling with the peripheral device to provide the conductive disconnection between the peripheral device and the host system when the peripheral device is inactive.

17. A system according to claim 15, wherein:

the controller, in response to an instruction from the host system to inactivate the peripheral device, conductively disconnects the peripheral device from the host system.

18. A system to reduce peripheral device exposure to electrical surge currents, comprising:

a plurality of isolated lines adapted for coupling with a peripheral device, the plurality of isolated lines including an isolated power line and one or more isolated data lines;

a contactor coupled to the isolated power line; and a controller in communication with the contactor and adapted for coupling with a host system, the controller provides electrical isolation between the plurality of isolated lines and the host system using the contactor when the peripheral device is inactive, and in response to an instruction from the host system, the controller powers the peripheral device via the isolated power line using the contactor and routes one or more data signals between the isolated data lines and the host system.

19. A system according to claim 18, further comprising:

one or more optical switches coupled to the controller, the isolated data lines and the contactor;

wherein the contactor powers the one or more optical switches in response to a signal from the controller and the controller routes the one or more data signals between the isolated data lines and the host system using the one or more optical switches.

20. A system according to claim 18, further comprising:

a battery;

wherein the contactor charges the battery when the at least one device is conductively disconnected from the host system by coupling a host system supply voltage to the battery.

21. A system according to claim 20, wherein:

the contactor powers the at least one device using the battery when the at least one device is conductively connected to the host system.

22. The method of claim 1, wherein:

the controller is part of a switching unit, the switching unit is hard-wired to the host system.

23. The method of claim 1, wherein:

the controller is part of a switching unit, the switching unit is removable from the host system.

24. The method of claim 1, wherein conductively connecting wires of the peripheral device to the host system comprises electrically coupling the wires of the peripheral device to the host system.

25. The method of claim 1, wherein conductively connecting wires of the peripheral device to the host system comprises physically connecting the wires of the peripheral device to the host system.

* * * * *